(12) United States Patent
Daudel

(10) Patent No.: US 6,769,122 B1
(45) Date of Patent: Jul. 27, 2004

(54) MULTITHREADED LAYERED-CODE PROCESSOR

(75) Inventor: Jeffrey L. Daudel, Santa Clara, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/347,618

(22) Filed: Jul. 2, 1999

(51) Int. Cl.[7] ................................................ G06F 9/00
(52) U.S. Cl. ...................................................... 718/102
(58) Field of Search ................................. 709/102, 201; 712/15; 719/310; 718/102, 107, 108

(56) References Cited

U.S. PATENT DOCUMENTS

| | | | | |
|---|---|---|---|---|
| 5,179,702 A | * | 1/1993 | Spix et al. ................... | 709/102 |
| 5,339,415 A | * | 8/1994 | Strout et al. ................. | 709/102 |
| 5,692,193 A | * | 11/1997 | Jagannathan et al. ....... | 709/106 |
| 6,003,066 A | * | 12/1999 | Ryan et al. .................. | 709/201 |
| 6,076,152 A | * | 6/2000 | Huppenthal et al. .......... | 712/15 |
| 6,233,599 B1 | * | 5/2001 | Nation et al. ................ | 709/102 |

OTHER PUBLICATIONS

"Operating System concepts", Fourth edition, Silberschatz et. al., 1994.*
"Pthreads Programming". Nichols et. al. 1996.*
Web Page, "Cierto Interactive Simulation Library", http://www.cadence.com/software/cierto/cierto_ntrctv_sm_lb.html, Entries: Key Features, Build Virtual Instruments Easily and Integrate and Optimize Designs Quickly and Painlessly, 1999 Cadence Design Systems, Inc. Corporate Marketing, 2 pages.
Web Page, "Cierto Hardware Design System", http://www.cadence.com/software/cierto/cierto_hrdwr_dsgn_system.html, Entries: An Extension of Signal Processing Work System, Hardware Design System Components, Optional Tools, 1999 Cadence Design Systems, Inc. Corporate Marketing, 6 pages.
Web Page, "Affirma Verilog–A simulator", http://www.cadence.com/software/affirma/affirma_vrlga_sim.html, Entries: Advanced Analog Behavioral Modeling System, Key Features and Benefits, Quick "What–if" Experiments, Supports Complete Multi–Disciplinary System Simulation, Combining Analog Modeling and Simulation, Sample Analog & Mixed–Signal Libraries Included, Easy–To–Use Mixed Schematics and Schematics and Language, The Affirma Verilog–A Simulator's Sample Library, Integrating AHDL with A Complete Top–Down Mixed–Signal Design Solution and Availability, 1999 Cadence Design Systems, Inc. Corporate Marketing, 5 pages.

(List continued on next page.)

*Primary Examiner*—John Follansbee
*Assistant Examiner*—Haresh Patel
(74) *Attorney, Agent, or Firm*—Squire, Sanders & Dempsey L.L.P.

(57) ABSTRACT

A multithreaded layered-code processing method includes: passing through the layered code to discover each layer of the layered code, acquiring a lock when a layer is discovered, determining whether to spawn a thread to process the discovered layer, and, if it is so determined, spawning a thread to process the discovered layer. The method may further include: releasing the lock once the new thread is either spawned or aborted, and, if spawned, proceeding with execution of the thread concurrently with other threads. Other embodiments include a processor for carrying out the method and a computer-readable medium having stored thereon instructions to cause a computer to execute the method.

28 Claims, 4 Drawing Sheets

OTHER PUBLICATIONS

Web Page, "Affirma NC Verilog Simulator", http://www.cadence.com/software/affirma/affirma_ncv.html, Entries: Key Features, Performance, Productivity, Quality and Reliability, Architected for the Next Generation of Electronics Design, Cadence Support and Services, You Can Count On Cadence, 1999 Cadence Design Systems, Inc. Corporate Marketing, 5 pages.

Web Page, "Affirma NC VHDL Simulator", http://www.cadence.com/software/affirma/affirma_nc_vhdl.html., Entries: Overview, VHDL Development for Mixed–Language Design, INCA Technology Delivers, Native Compilation, The Sim Vision Debugger, Key Features, 1999 Cadence Design Systems, Inc. Corporate Marketing, 6 pages.

* cited by examiner

MULTITHREADED LAYERED-CODE PROCESSOR

FIELD OF THE INVENTION

This application relates to multithreaded processing and, specifically, to multithreaded code processing.

BACKGROUND OF THE INVENTION

Computer programs (hereafter "programs") are written in order to handle a task, typically in response to some problem to be solved. Structurally, programs include program code in the form of statements written based on grammatical rules which are also referred to as the language syntax. Statements such as, for example, declaration, definition, assignment and function statements outline the type of, and the manner of creating and manipulating, data abstractions. A series of statements that manipulates one or more data abstractions can be viewed as a supporting abstraction and is referred to as an algorithm. Data abstractions represent any simple or complex data structure types that model abstract concepts or objects in the real world. Data structures may include a numerical value or any programmatic combination thereof, a dictionary entry, an array of objects, a decision flag, an entry in a database of electronic hardware components, or a basic electronic hardware item description. Generally, a program design identifies the candidate data obstructions of a task and/or problem domain, the supporting abstractions of an implementation of the task or solution, and the relationship between the various abstractions.

In a computer, the program design and execution is facilitated by an operating system. The operating system is charged with controlling the operations of a computer system. The operating system is responsible for managing computer system resources, as well as compiling programs to convert the statements in programs to an executable form and managing the execution of such programs once they are compiled and linked into executable modules. An operating system such as the UNIX operating system (hereafter "UNIX") includes a kernel and system programs. UNIX is a registered trademark of UNIX Systems Laboratories, Inc. The kernel provides, by responding to system calls, a file system, a processor scheduling, memory management, etc. System programs include system libraries, compilers, interpreters, shells, etc. Compilers convert program statements (also known as source code) into object code. For example, a C compiler translates C source programs into object modules or into executable modules. An option of the C compiler (e.g., the -c option) causes the C compiler to produce an object module rather than an executable module.

In general, compilation of programs involves translation of program source code into object modules or executable modules that are ready to be loaded and executed. The compilation process, also referred to as language code processing, proceeds in stages. An initial input stage of a compiler performs a lexical analysis of symbols and tokens in the program statements. This phase is followed by parsing to determine the syntactic structure of statements in the program. In order to produce the syntactic structure of program statements, a parser normally takes as input a sequence of symbols and tokens output by a lexical analyzer. Since programs typically also includes statements for macro definitions and references to library and other header files to be included, a preprocessor expands the macros and includes the header files. Header files provide, for example, symbols definitions and function prototypes. The preprocessor copies header files into the source code programs prior to compilation. The macros represent the compiler options so that compiler options need only be changed in one place rather than in the entire file.

Next, the compiler makes several passes through the program source code to translate the code first to the assembly language of a target machine and then into machine code. The result is an object module consisting of machine code and tables of unresolved external references.

An object module cannot be loaded into memory or executed until it is linked to libraries and other modules to resolve external references. Hence, the final stage of compilation links a collection of object modules together to form an executable module with all the external references resolved. Only those parts in a library that corresponds to unresolved references are incorporated in the executable module. References present in shared libraries are loaded at run time using dynamic loading. To that end the compiler scans the shared libraries for references but does not put them in the executable module. Loading libraries is accomplished by explicitly specifying pathnames for directories to be searched for the libraries.

In more specific terms, compilation can be one phase in a more comprehensive language code processing. Considering, for example, a hardware design system in which the language used is any commercially available or proprietary hardware description language (HDL). HDL is a language typically used for conceptual design of integrated circuits. Verilog is an example of an HDL for electronic design and gate level simulation by Cadence Design Systems (hereafter "Cadence"). Verilog is a trademark of Cadence.

Much like any other program, HDL programs have statements written based on language syntax, in this case HDL syntax. The data obstructions include data structures such as an electronic hardware database or components library (collectively referred to as the "database") that can be created and modified by the HDL program statements or code. A benefit provided by the use of the database is the creation and enforcement of standards. For example, the database defines common interfaces, buses, and building blocks. The database may also define common hardware specification and logic functionality. Engineers can refer to common information such as the common building blocks and interfaces information and develop in synch hardware, firmware and software.

In a concept-to-implementation loop of an integrated circuit design, HDL is used for modeling electronic hardware components of the integrated circuit, singly or in combination. Simulation and optimization are phases in the design loop following the generation, compilation and linking of the HDL programs. The concept-to-implementation loop is iterative. Namely, the conceptual design, HDL program generation and compilation, simulation, analysis, and adjustment cycle is repeated throughout the design process using various parameters in each iterations (e.g., timing specifications).

In order to make the concept-to-implementation loop efficient, more efficient simulation, optimization, and re-creation and compilation the HDL programs are required. Increased efficiency is required, for example, since the HDL programs generation, compilation and linking (hereafter "code processing") draws from the ever growing library of hardware building blocks to become more complex and time consuming.

For virtual implementation of circuits at any level including integrated circuits, the design process described above is interactive. Ideally, an interactive design process allows a user to virtually create, test and evaluate integrated circuits in real time. However, the complexity and time consumption of HDL programs code processing increases in a direct relationship with the increased complexity and size of the HDL programs and hardware libraries. For real large databases the interactive design cycle takes too long, i.e., it takes too long to add or retrieve information from the data base and process the HDL program code using this information. Hence, whether it is a commercially available HDL, such as Verilog, or a proprietary program language, the HDL program code processing efficiency need to be improved in order to improve the design cycle. The efficiency of code processing is of particular importance in an interactive design cycle.

Moreover, as a general observation, the efficiency of code processing is important for any given type of programming language. Accordingly, what is needed is a more efficient program code processing. The present invention addresses this and related problems.

SUMMARY OF THE INVENTION

The present invention relates to multithreaded program code processing. A preferred embodiment of the present invention provides multithreaded layered-code processing for improved efficiency of program code processing. Conceptually, the present invention breaks the task of program code processing into smaller tasks, i.e., threads, which can be executed concurrently. Concurrent processing of layers of code, through multithreading, is far more efficient then serial processing the layers of code. Preferably, the multithreading is implemented in a multiprocessor environment for concurrent execution of the multiple threads.

In accordance with the purpose of the invention, as embodied and broadly described herein, one aspect of the invention is a method including steps for the multithreaded processing of layered code. Another aspect of the invention is a computer readable medium. The computer readable medium embodies computer program code configured to cause a computer system to perform steps for the multithreaded processing of layered code.

In accordance with the preferred embodiment of the present invention, the steps include passing through the layered code to discover each layer of the layered code. The steps also include acquiring a lock when a layer is discovered, determining whether to spawn a thread to process the discovered layer, and, if it is so determined, spawning a thread to process the discovered layer. The steps further include releasing the lock once the new thread is either spawned or aborted, and, if spawned, proceeding with execution of the thread concurrently with other threads.

In further accordance with the purpose of the invention, as embodied and broadly described herein, an additional aspect of the invention is a multithreaded layered-code processor. Yet another aspect of the invention is a multithreaded layered-code processing system. The system includes a multiprocessor environment for concurrent execution of multiple threads, and a memory including a code processor.

The multithreaded layered-code processor and the code processor of the system (hereafter collectively referred to as "the code processor") similarly include means for passing through the layered code to discover each layer of the layered code, means for acquiring a lock when a layer is discovered and means for determining whether to spawn a thread to process the discovered layer. The code processor further includes means for spawning a thread, if it is so determined, for processing the discovered layer, means for releasing the lock, and means for proceeding with execution of the thread concurrently with other threads.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF A PREFERRED EMBODIMENT

Figure 1:
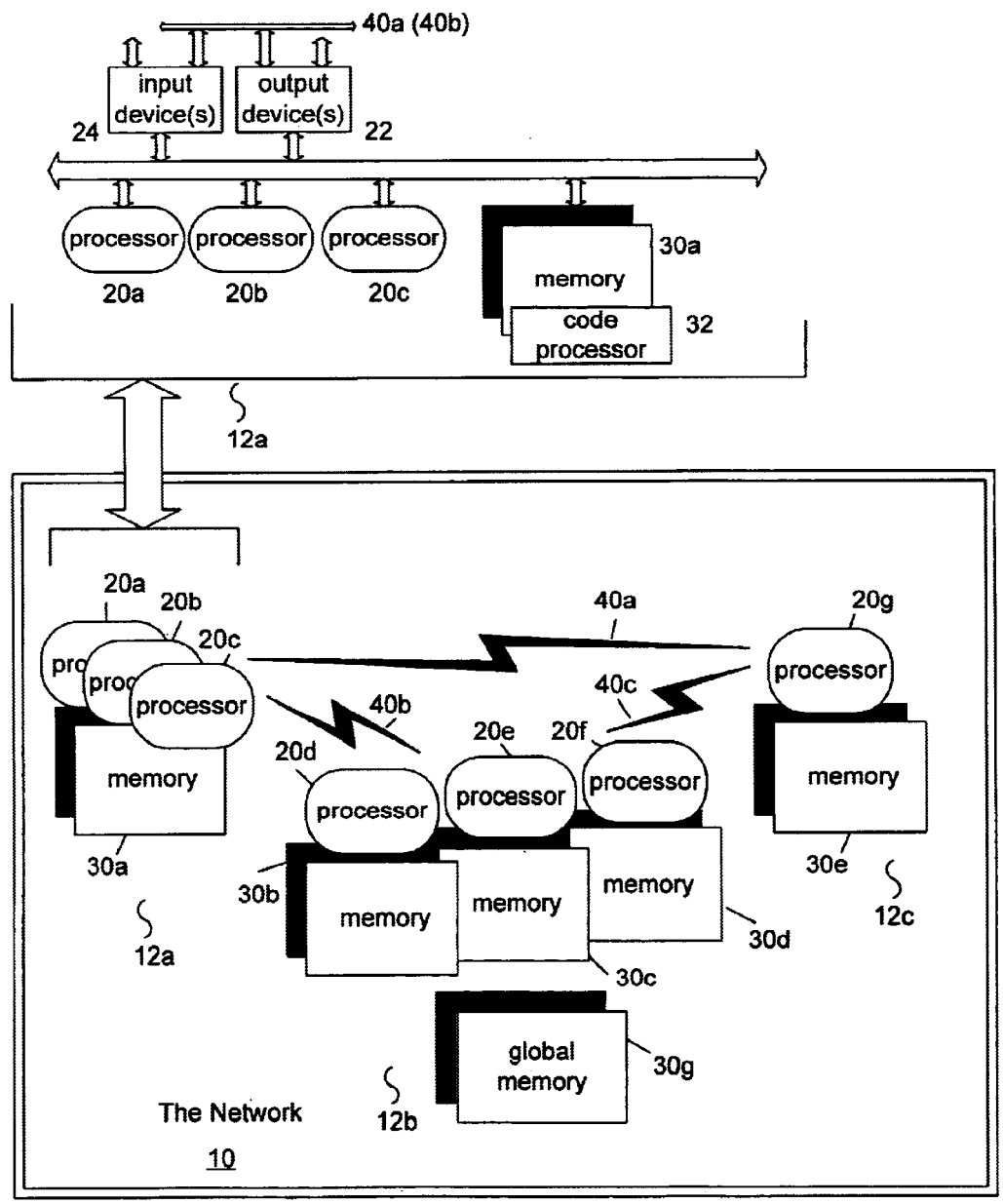
FIG. 1 illustrates a system as a representative environment for implementing an embodiment of the present invention.

The present invention relates to multithreaded layered-code processing. As embodied and broadly described herein, the present invention resorts to concurrency and multithreading in order to provide a more efficient program code processing. Conceptually, the present invention breaks the large task of program code processing into a number of smaller tasks which can be executed concurrently using multithreading. The present invention is most advantageous in processing layered program code. Since the layered-code nature is inherent in most programs, the present invention is beneficial in handling the code of most programs. A preferred embodiment of the present invention provides multithreaded layered-code processing.

Reference will now be made in detail to the preferred embodiment of the invention which is illustrated in the accompanying drawings. Wherever convenient, the same reference numbers will be used throughout the drawings to refer to the same or like parts.

The dramatic increase in computing power have triggered fundamental changes in computer programs design (computer programs are hereafter simply referred to "programs"). The efficiency of modern programs design and implementation, particularly program code processing, is markedly improved by the present invention due to the use of multithreading and concurrency. The present invention complements computing trends towards sophisticated data sharing and real-time interaction of applications, all of which frequently rely on concurrency. By comparison to conventional serialized program code processing, concurrency in program code processing is far more efficient.

Concurrency is generally the sharing of resources in the same time frame. For example, programs whose execution is interleaved in time so that each program is allocated a quantum of the time frame (a similar amount of processor time) are timesharing programs. Also, programs executing on the same system so that their execution is interleaved in time are sharing a processor resource. Program can likewise share data, code and devices.

To achieve concurrent execution multiple processes are instituted. In contrast to a program which is a static sequence of statements, a process is an instance of a program in execution along with resources that are required for the application program to run. A process is instituted by dynamic invocation of the program.

Modern operating systems allow more than one process to be ready to execute in what is referred to as multiprogramming. The UNIX operating system (hereafter "UNIX") is an example of such operating system. UNIX is a registered trademark of UNIX Systems Laboratories, Inc. Though the description herein uses UNIX as an example, it should be noted that the techniques and principles of the present invention apply to any operating system. UNIX allows also timesharing (known additionally as multitasking). Timesharing is an extension of multiprogramming where a processor is switched back and forth between processes (tasks or sub-tasks) in what is referred to as context switches. A context switch is the act of removing a process from the running state and replacing it with another process. A context of a process is the information that is needed about a process and its environment in order to restart it after a context switch.

A process has one or more flows of control, or streams of statements execution, called program threads of execution or, simply, threads. Threads provide an efficient and convenient concurrent programming paradigm for system programs or applications running on shared-resources multiprocessors.

As a natural extension of the process model, multiple threads are allowed to execute within the same process. This extension provides an efficient way to manage threads that share both code and data by avoiding context switches. Since multiple threads are allowed to execute within the same process, multiple threads can simplify the programming task by breaking it down into a number of smaller tasks. Multiple threads can also provide an I/O (input/output) and processing overlap capability. Thus, threads can be concurrent entities providing concurrency within a program and within a process.

A typical thread package contains a runtime system to manage threads in a manner transparent to users. A thread package usually provides for the dynamic creation and destruction of threads, as well as mutual exclusion of threads and condition variables, as will be further explained below. A common thread package is compliant with standards such as POSIX (portable operating system interface). For example, POSIX threads are managed under POSIX.1 thread management. POSIX is a system level standard established by the Institute of Electrical and Electronic Engineers (IEEE) and known as IEEE std. 1003.1 or POSIX.1. POSIX specifies the standard of an interface between an operating system and a user so that application programs are portable across platforms. POSIX encompasses various operating systems including UNIX.

Managing the concurrent operations of a computer system is a major responsibility of operating systems such as UNIX. Multiprocessor and distributed systems are examples of architectures in which concurrency control has an important role. In multiprocessor systems, several processors access shared resources such as memory. In tightly-coupled multiprocessor systems, the processors share the memory and clock and communicate with each other through the shared resources (memory). In loosely-coupled multiprocessor systems, also known as distributed systems, each processor has its own memory and clock and the processors communicate with each other through a bus or a communication channel. In distributed systems concurrency and communication meet to form models of distributed computation, frequently over a network. An alternative to a truly distributed operating system is to provide application layers which run on top of a common standalone operating system to exploit parallelism on a computer network. In this case, a software package is employed to allow a collection of heterogeneous UNIX systems to function as a parallel computer for performing large computational tasks.

FIG. 1 illustrates a system as a representative environment for implementing an embodiment of the present invention. A design feature of the present invention is to allow the concurrency and multithreading techniques and principles of the present invention to map as efficiently as possible onto any multiprocessor architecture. The architecture model presented in FIG. 1 is a network of computer systems ("the network") 10. Structurally, the network 10 includes computer systems, e.g., 12$a$–$c$ (hereafter collectively "12"). It is noted however, that an embodiment of the present invention may be alternatively implemented in a single computer. For example, computer system 12$a$ may be used independently as an environment for implementing an embodiment of the present invention. Computer system 12$a$ is illustrated as a tightly coupled multiprocessor system in which the processors 20$a$–$c$ share the memory 30$a$ and clock (not shown) and communicate with each other through the shared memory 30$a$. The memory 30$a$ is shown to include a code processor 32 that defines the way in which the concurrency and multithreading are implemented for processing the program code. Computer system 12$a$ is shown to further include input device(s) 24 and output device(s) 22 for user interface and for communications purposes, e.g., through communication channel(s) 40$a$ (40$b$).

The architecture model presented in FIG. 1 is a network of computer systems 12 of various architectures. As noted before, computer system 12$a$ is a tightly coupled multiprocessor system. Computer system 12$b$ is a loosely coupled computer system in which each of the processors 20$d$–$f$ has its own memory 30$b$–$d$, respectively, and clock (not shown). The processors 20$d$–$f$ of computer system 12$b$ communicate with each other through various communications channels such as a bus (not shown). In addition, the processors 20$d$–$f$ of computer system 12$b$ share a common memory 30$g$ (referred to as a global memory). By comparison, computer system 12$c$ has a single processor 20$g$ and memory 30$e$ which can be described as either private or shared-nothing memory. In addition to memory 30$a$ of computer system 12$a$, any one or more than one of memories 30$b$–$e$ may have a code processor similar to code processor 32. Alternatively, code processor 32 in memory 30$a$ may be utilized in the network 10 as a shared application.

In all, the network 10 can be also viewed as a distributed system, or a loosely coupled system, in which concurrency and communication meet to form applications including a code processor application in accordance with an embodiment of the present invention. Communications between the computer systems 12 are accomplished via communications links such as communications channels 40$a$–$c$. In network 10, the group of processors 20$a$–$c$ and each of processors 20$d$–$f$ and 20$g$ have their own memory 30$a$, 30$b$–$d$ and 30$e$ respectively, and clock (not shown). By using the communications channels 40$a$–$c$, the processors 20$a$–$g$ may gain access (directly or indirectly) to data stored in the global memory 30$g$ of computer system 12$b$. As an example, the global memory 30$a$ may include a shared electronic hardware database or library that is created and manipulated by the code processor (e.g., 32). Although not shown, each of the computer systems 12 typically has input and output devices to provide an interface to the communications channels 40*a–c* and for user interface.

An operating system (not shown) such as UNIX in each of the computer systems 12 controls and coordinates the operations of the respective computer systems 12. The operating system makes the use of each computer system hardware and the various system and application programs more efficient. An operating system such as UNIX includes a kernel and system programs. The kernel provides, by responding to system calls, a file system, a processor scheduling, memory management, etc. System programs include system libraries, compilers, interpreters, shells, etc.

As noted before, structurally, programs include program code in the form of statements written based on grammatical rules which are also referred to as the language syntax. Compilers convert program statements (also known as source code) into object code. For example, a C compiler translates C source programs into object modules or into executable modules. An option of the C compiler (e.g., the -c option) causes the C compiler to produce an object module rather than an executable module.

In general, compilation of programs involves translation of program source code into object modules or executable modules that are ready to be loaded and executed. The compilation process proceeds in stages. First, a preprocessor expands macros and includes header files. Header files provide, for example, symbols definitions and function prototypes. The preprocessor copies header files into the source code programs prior to compilation. The macros represent the compiler options so that compiler options need only be changed in one place rather than in the entire file. Next, the compiler makes several passes through the program source code to translate the code first to the assembly language of a target machine and then into machine code. The result is an object module consisting of machine code and tables of unresolved external references. An object module cannot be loaded into memory or executed until it is linked to libraries and other modules to resolve external references. Hence, the final stage of compilation links a collection of object modules together to form an executable module with all the external references resolved. Only those parts in a library that corresponds to unresolved references are incorporated in the executable module. References present in shared libraries are loaded at run time using dynamic loading. To that end the compiler scans the shared libraries for references but does not put them in the executable module. Loading libraries is accomplished by explicitly specifying pathnames for directories to be searched for the libraries.

As noted before, the efficiency of program code processing (e.g., as described above) is important for any given type of programming language. The present invention, as embodied and broadly described herein, resorts to concurrency and multithreading in order to provide a more efficient program code processing. As further indicated, conceptually, the present invention breaks the large task of program code processing into a number of smaller tasks, i.e., threads, which can be executed concurrently. Since most programs are inherently structured in layers of program code, the breaking into small tasks of the program code processing preferably involves handling in parallel several layers of code. In other words, for each new layer of code encountered by the program code processor, a new thread is spawned to handle the new layer concurrently with the handling of other layers by other threads. Alternatively, the breaking into small tasks of the program code processing may involves handling in parallel several segments of the program code.

Figure 2:
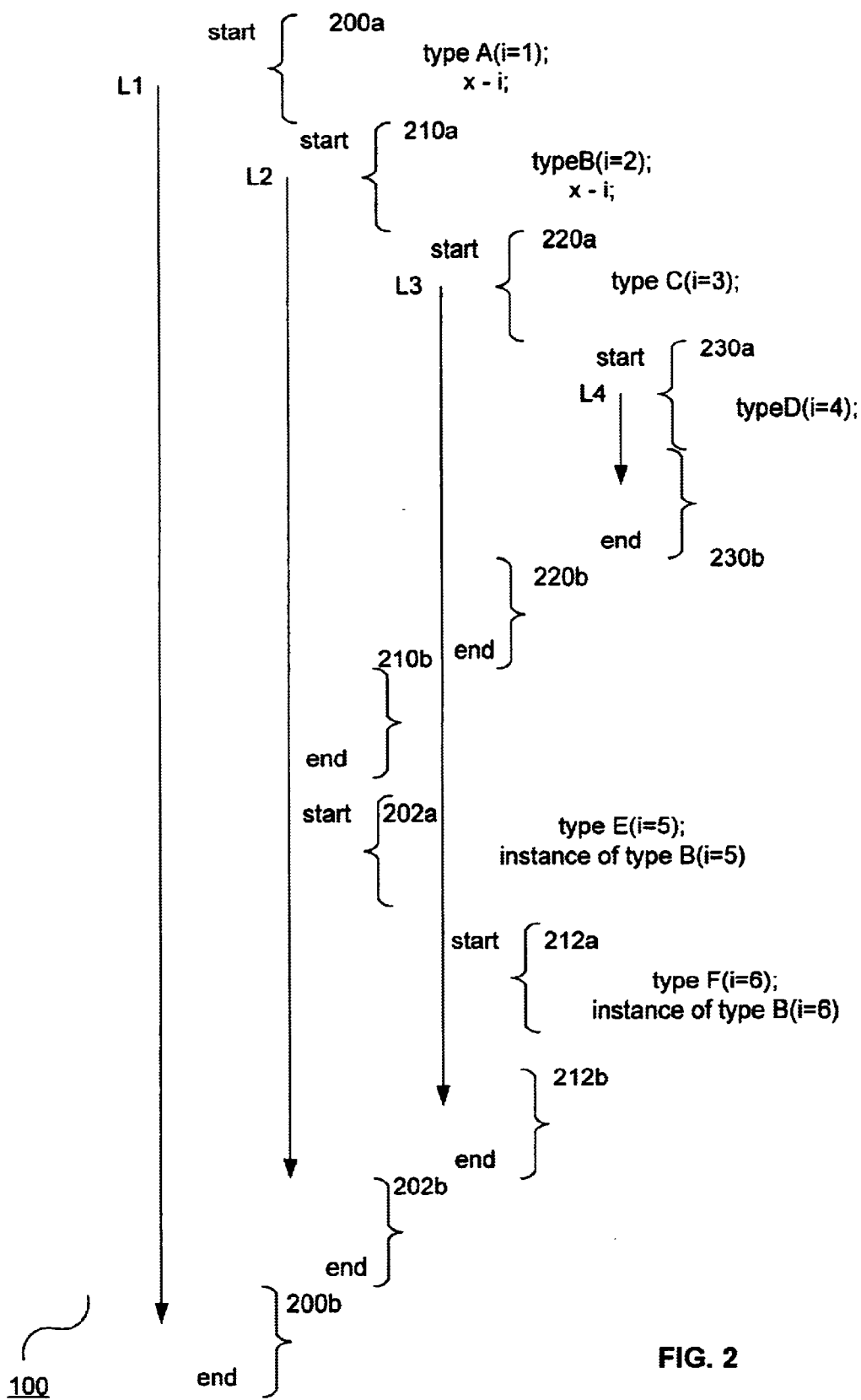
FIG. 2 illustrates a program with a layered code structure.

FIG. 2 illustrates a program 100 with a layered code structure. Each layer starts and ends with a respective token or symbol. For instance, a start token "{" (e.g., 200*a*) signifies the start of a layer, and an end token "}" (e.g., 200*b*) signifies the end of the layer. When a start token "{" (e.g., 210*a*) is reached a new layer starts. Layers may be nested, and at each level of nesting there is a start token "{ ∓ and end token "}" which complete the nested layer.

For example, at a first level (L1) a parent layer starts with start token "{" 200*a*. The code proceeding after the start token 200*a* of the parent layer reaches a second layer of code, the child layer, at a second nesting level (L2) which starts at start token "{" 210*a*. The code proceeding after the start token 210*a* of the child layer reaches a third layer of code, the grandchild layer, at a third nesting level (L3) which starts at start token "{" 220*a*. The code proceeding after the start token 220*a* of the grandchild layer reaches a fourth layer of code, the grand grandchild layer, at a fourth nesting level (L4) which starts at start token "{" 230*a*. The code proceeding after the start token 230*a* of the grand grandchild layer encounters an end token "}" 230*b* which ends this layer of code at the fourth level of nesting.

At this point the first through third layers of code have not reached their respective end tokens 200*b*, 210*b* and 220*b*. The end tokens of these layers are reached in this example in the order of 220*b*, 210*b* and 200*b*. However, as shown in this example, before the end token 200*b* is encountered at the first level (L1), to complete the parent code layer two more layers of code are encountered. At the second nesting level the additional layer starts at 202*a* and ends at 202*b*. Nested in this layer, at the third nesting level, is the layer that starts at 212*a* and ends at 212*b*.

From this illustration it becomes evident that the layer of code at a particular level of nesting does not reach its end token until its children layers of code at higher nesting levels have reached their respective ends. Though not shown, at each layer of code there may be a series of statements beyond the child layer end token and before the end token (e.g., 220*b*, 210*b*, or 202*b*) of the layer. For example, statements including the exit code of the particular layer of code are available after the child layer code and before the end token of this particular layer. Moreover, each layer is assigned a value, e.g., an index 'i' where i=1, i=2, . . . i=5 etc.

Taking for example a hardware design system in which the language used is any commercially available or proprietary electronic hardware description language (HDL). An HDL language can be for example an electronic hardware database language (hereafter "the language") for creating and manipulating entries in the database and for using data entries for integrated circuit design and gate simulation. Using FIG. 2 to describe the layout of the language, each layer is directed to building and/or manipulating a data entry in the electronic hardware database. Assuming, for example, that the database is structured as a tree with parent and children nodes. In that case, each layer of code is viewed as being directed to creating and/or manipulating a node in the database tree structure.

As part of creating and/or manipulating the nodes, the language may define types of electronic hardware data or parameters such that in the parent layer of code (at nesting level L1), where i=1, types A is defined. In the child layer of code (at nesting level L2), where i=2, type B is defined. Similarly, in the children layers of code (at nesting levels L3 and L4), where i=3, 4, 5 and 6, types C, D, E and F are respectively defined. Additionally as part of creating and/or manipulating the nodes, the language may defined function prototypes, or templates, for building the nodes and for building circuits from nodes (database entries data), for example, by combining nodes (hardware building blocks or cells). One such function prototype is illustrated as "x-i;". At the parent layer (starting at 200*a*) this function means "x-1;" and at the first child layer of code (starting at 210*a*) this means"x-2;".

The type and prototype definitions are encapsulated such that the children layers of code cannot inherit the definitions in the parent layer because the code has not yet been fully processed and the definitions not yet fully resolved. This is unlike inheritance from super-class objects in compiled or executable object oriented programs. Compiled or executable object oriented programs are produced at the conclusion of compilation or linking after the compiler has passed through the entire code and has resolved all the definitions and declarations. Hence, subclass objects can inherit properties from their respective super-class objects which are all fully defined and known. By contrast, prior to completion of the program code processing the type and prototype definitions are not all fully defined and known. In processing each layer of code the definitions in the code are not complete until all nested layers have completed and returned their results (final definitions) to the parent layer of code. In other words, the program code processor must pass through the entire code of the layer and its children layers before the types and prototypes can be considered fully resolved and clearly defined. As a result, children layers cannot inherit or use instances of types and prototypes from a parent. However, children may use types defined in sibling layers of code because, by definition, processing of a sibling layer of code must be completed before the next sibling layer of code can be processed.

Accordingly, FIG. 2 illustrates that once the end token 210*b* is reached type B is fully defined and available; and so are types C and D. A next thread may be spawned after encountering the start token 202*a* and in processing this thread an instance of type B can be used. This implies that a parent has to wait for processing of all the children to end before it can exercise its own exit code, as will be further explained below. The foregoing further implies that the data structures and code of each layer ought to start at proper memory locations (e.g., boundaries) so that data is not corrupted by the concurrent processing of layers of code. In other words, protecting data from corruption may be needed if the data abstractions are not defined ahead of time to prevent data corruption. In accordance with the preferred embodiment of the present invention, the data abstractions that define the nodes in the database (represented in the exemplary program layout of FIG. 2 as types A–F) are designed in advance to prevent data corruption due to the concurrent execution of multithreads for processing layers of code.

Figure 3:
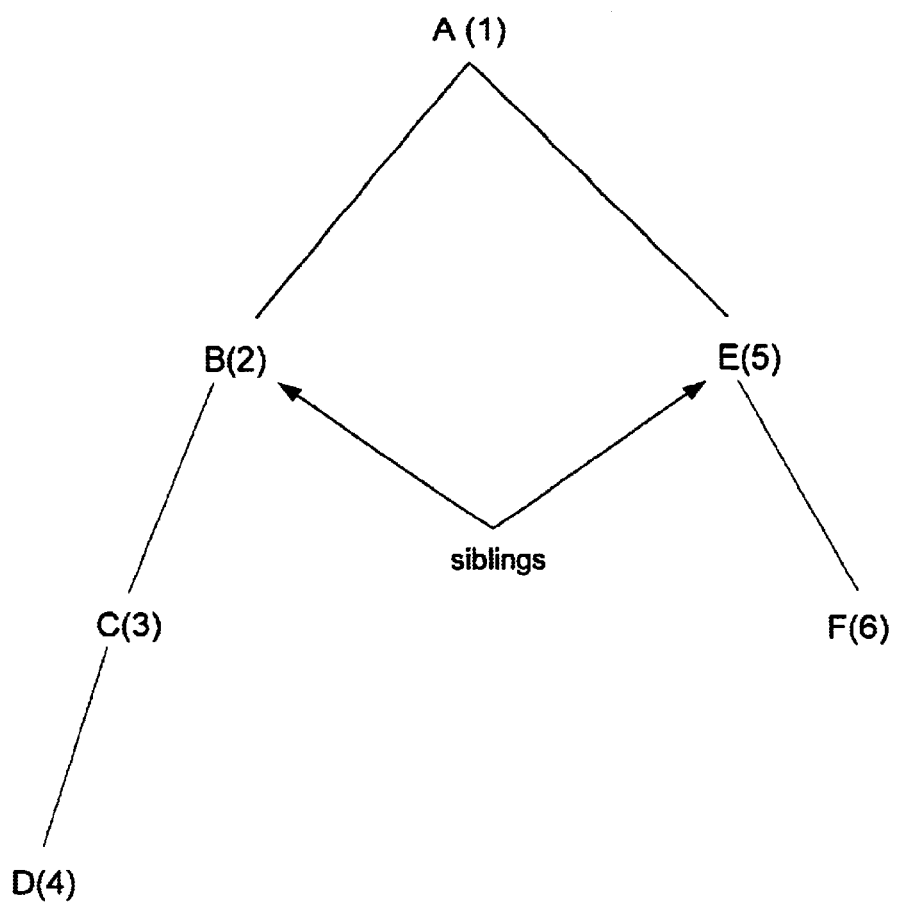
FIG. 3 shows multithreading used in processing the layered program code of FIG. 2.

To present the concept of multithreading in accordance with an embodiment of the invention, FIG. 3 shows multi-threading used in processing the layered program code of FIG. 2. Where necessary, the discussion about FIG. 3 refers back to FIG. 2. As noted before, the parent layer code defines type A. In a database with a tree structure, type A represents the parent node A. The parent node, A, is created and/or manipulated by the code in the parent layer. The thread instituted to process node A is shown as thread 1 (i.e., "A(1)" indicated node A thread 1). The children layers of code that define types B and E are siblings for reasons as explained above. Hence, after the layer of code for creating and/or manipulating type B is processed by thread 2, and instance of type B can be used by thread 5 in processing the layer of code for creating and/or manipulating type E. In the tree structure, types B and E can be viewed as children nodes of A. In creating nodes B and E, type A cannot be used because, by definition, the processing of the code for type A definition is not complete until all the children of A (in all nesting levels) are completed. As shown in FIG. 2, the layers of code for creating types C and D (nodes C and D), respectively, are nested in the layer for creating type B (node B). Accordingly, only after thread 4 is completed followed by completion of thread 3 (C and D are not siblings), type B definition can proceed to completion. Similarly, only after thread 6 is completed, type E can be considered fully defined.

Completion of a definition, creation and/or manipulation of a type, parent or otherwise, is typically performed by a corresponding exit code. At each layer, processing the exit code does not commence until processing of all nested layers is complete to ensure that all error flags are addressed and all the children type definitions are complete.

Figure 4:
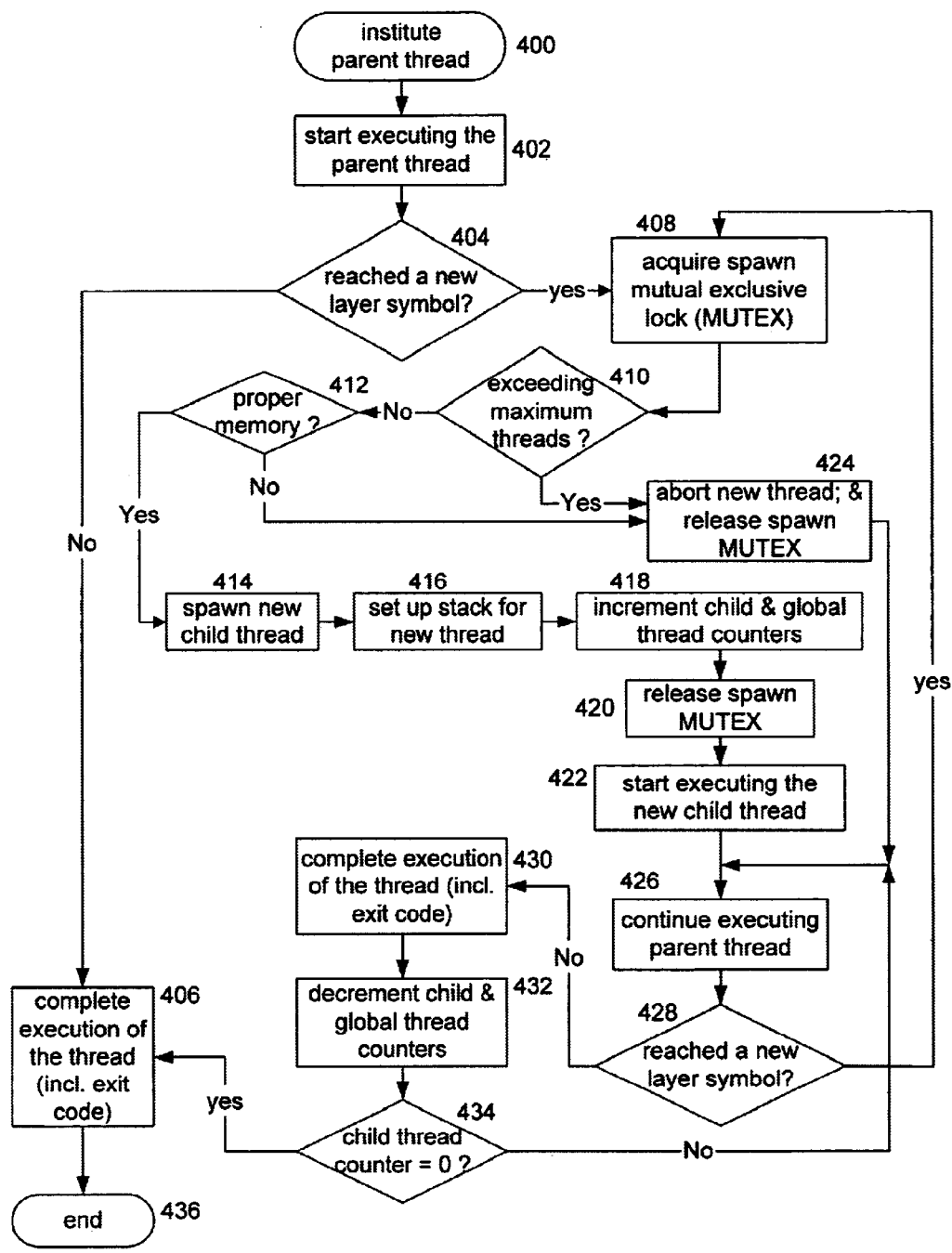
FIG. 4 is a flowchart of a multithreaded program code processor for processing a layered code.

In order to further illustrate how the concurrent threads interact with each other, FIG. 4 is a flowchart of the multithreaded program code processor for processing a layered code (hereafter, the multithreaded program code processor for processing a layered code is referred to as the "multithreaded layered-code processor"). The code processor starts by instituting a parent thread, via step 400. As shown in FIG. 2, the parent thread is instituted when the multithreaded layered-code processor encounters the first start token ("{" 200*a*). The parent thread commences execution, i.e., processing of the code (program statements) and defining, creating and/or manipulating a type (e.g. node A), via step 402.

While the code in the parent layer is being processed by the parent thread, a nested layer of code may be encountered. If it is determined, via step 404, that no new layer symbol, i.e., no start token, was reached, then processing by the parent thread of the parent layer of code proceeds to completion, via step 406. Typically, the last part in this process is the exit code. Following completion of the parent layer of code, the layered program code processing ends, via step 436.

Conversely, if it is determined, via step 404, that a new layer symbol, i.e., a start token, was reached, the multi-threaded layered-code processor is ready to spawn a new thread, unless spawning of the thread is prevented by certain conditions, as later explained. In general, when a new thread is spawned care must be taken to prevent interference with other threads which are currently active. For example, though the currently active parent thread may not complete processing the parent layer code until the new (child) thread completes processing the child layer code, the parent thread may continue to execute concurrently with the child thread. However, concurrency in multithreading requires measures of control to prevent interference between the threads.

It is noted that the concurrent execution of threads is preferably performed in a multiprocessor environment. A representative system that provides such environment is shown in FIG. 1.

Typically, protection against interference is needed during a critical section of the program code processing when using multithreading and attempting concurrent access to a shared resource (e.g., a hardware database in the global memory of system 12*b* in FIG. 1). In general, the critical section of a program or, simply, the critical section, is the portions of the program in which each thread tries to access such a shared resource. During the critical section of the program code processing a shared resource should be accessed only by a single thread at a time. That is, the resource requires exclusive access by the threads (or processes if the task is not as large and multiprocessing is used instead). Hence, spawning of a thread is a critical section of the multithreaded layered-code processor. Even in cases where the data abstractions are designed ahead of time to prevent interference and/or data corruption, spawning of threads remains a critical section of the multithreaded layered-code processor.

One method of providing mutual exclusion employs a locking mechanism in which a thread requires a lock that excludes other threads before entering the critical section in the layer of code. When the critical section is finished, the lock is released. Another approach is to encapsulate shared resources in a manner that ensures exclusive access, as in object-oriented design. Shared data abstractions representing resources are encapsulated as objects with well-defined access (interface) functions. These access functions have exclusive access built in which is the only way to access such resources.

As noted before, spawning of a thread is a critical section of the multithreaded layered-code processor. To provide mutual exclusion during this critical section, the locking mechanism is used, although other methods are not precluded by the present invention. Namely, a spawn mutual exclusive (MUTEX) lock is acquired before spawning a child thread when the parent thread encounters the start token of a nested layer of code (step 408).

Next, a determination is made, via step 410, whether the number of threads currently active exceeds a predetermined maximum number. A further determination is made, via step 412, whether there is proper memory allocation for the thread such as sufficient memory allocation for a stack etc. If either the number of threads exceeds the maximum or the memory allocation is improper, spawning of the new thread is aborted, via step 424. Additionally, the spawn MUTEX lock is released, via step 424. This does not mean that in the future a new thread may not be spawned if the foregoing conditions, number of threads and proper memory, are satisfied. In fact, the currently executing thread(s) may continue processing the code, via step 426, and in so doing may encounter a new layer symbol (start token). If a symbol indicating a new layer of code is reached (step 428), then the multithreaded layered-code processor returns to acquire a spawn MUTEX lock before spawning the new child thread, via step 408. The steps that follow, steps 410, 412, 424 and/or 426, have been already described and are performed in the same manner as before.

Whatever child thread is to be spawned, if the conditions of number of threads and proper memory allocation are satisfied (steps 410 and 412), the new child thread is spawned, via step 414. Next, a stack is set up for the new child thread, via step 416. Additionally, in order to keep count of the number of threads being spawned a child thread counter is incremented, via step 418, to indicate the spawning of the new thread. Each thread has a child thread counter the keeps count of the number of threads being spawned. In addition, there is a global thread counter. The global thread counter is considered a shared resource because it too is incremented when a thread is spawned (step 418). However, in order to prevent simultaneous incrementing of the global thread counter by more than one thread, the spawn MUTEX lock is not released until after the global thread counter is incremented. At this point the spawn MUTEX lock is released, via step 420. Execution of the new child thread is started, via step 422. In addition, execution of the parent thread is now able to proceed (step 426). By contrast, concurrent execution of the other threads continues uninterrupted by the spawning of a child thread.

For each of the concurrently executing threads, including the new child thread, it is determined (in step 428) whether a new layer is reached. If so, the multithreaded layered-code processor returns to acquire spawn MUTEX lock (step 408) before spawning a new child thread. A new child thread is spawned provided that the number of threads and proper memory conditions are satisfied (steps 410, 412, 414, 416, 418, 420, and 420). Spawning of a new child thread is aborted (step 424) if these conditions are not met. In this case, the parent thread continues executing without spawning the new child thread. Moreover, concurrent execution of the other threads continues uninterrupted by the spawning of the child thread. In fact, if while continuing concurrent execution of the threads, the (last spawned) new child thread does not find (in step 428) a new layer symbol (start token), execution of the new child thread completes, via step 430. As mentioned before, typically this includes executing an exit code which, if necessary, also provides or checks error indications.

Once execution of the new child thread completes, the multithreaded layered-code processor decrements the child thread counter and the global counter, via step 432. The number of threads eventually is reduced to zero when execution of the last thread, the parent, completes (steps 434 and 406). Before this happens however, concurrent execution of the remaining threads continues, via step 426, until one by one execution of the threads completes. When execution of all the threads is complete, the multithreaded layered-code processor ends the program code processing, via step 436. At this point, the definitions in the program can be considered fully resolved and complete. At the close of such code processing, taking, for example, the electronic hardware database and assuming that it is created by the language in the form of a tree, all the nodes are fully defined. In other words, processing the code (where the code is written in accordance with syntax of the language) results in nodes of the electronic hardware database being created, manipulated and/or combined to form an electronic circuit whose hardware components and parameters are defined.

In summary, the large task of program code processing is broken into a number of smaller tasks—i.e., threads—which are executed concurrently. Due to the use of concurrency and multithreading, the efficiency of modern program design and implementation techniques, particularly, program code processing, is markedly improved by the present invention.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for multithreaded processing of layered code, comprising:

traversing through the layered code to discover each layer of the layered code;

determining whether to spawn a thread to process the discovered layer; and, if it is determined to spawn the thread:

acquiring a lock, before spawning a child thread when a parent thread encounters a start token of a nested layer of the layered code, to exclude other threads from accessing the child thread;

spawning the child thread to process the discovered layer;

release the lock;
proceeding with execution of the child thread concurrently with other threads; and
wherein the child thread cannot inherit definitions from the parent thread.

2. A method as in claim 1, further comprising:
releasing the lock once the child thread is either spawned or aborted.

3. A method as in claim 1, wherein the thread is spawned if a number of spawned threads is not exceeding a predetermined number and proper memory is allocated for the thread.

4. A method as in claim 3, wherein the number of spawned threads is indicated by a global thread counter, the global thread counter being incremented each time a thread is spawned, the global thread counter being decremented each time execution of a thread completes.

5. A method as in claim 1, wherein the spawned threads are counted by a global thread counter, wherein initially the global thread counter is at a value, and wherein the global thread counter returns to the value when a last thread remains to be completed.

6. A method as in claim 1, wherein the spawned threads are counted by a child thread counter, the child thread counter being incremented each time a thread is spawned, the child thread counter being decremented each time execution of a thread completes.

7. A method as in claim 1, wherein execution of the thread completes with execution of exit code.

8. A method as in claim 1, wherein the layered code includes a parent layer having a nested layer, and wherein processing of a nested layer must end before processing of the parent layer can complete.

9. A method as in claim 1, wherein the layered code includes a parent layer having nested layers, a nested layer can be a sibling of another nested layer if both of the nested layers are at a similar level of nesting, each of the parent and nested layers having code for defining a type, each type being encapsulated such that the parent layer cannot, but the sibling of a nested layer can, use an instance of types defined in the nested layer, and such that processing of the nested layers must end before processing of the parent layer can complete.

10. A method as in claim 9, wherein one thread is spawned for each type.

11. A method as in claim 1, wherein the layered code is written in accordance with a syntax of a hardware description language (HDL), and wherein the HDL is any commercially available or proprietary language for electronic circuit design and simulation.

12. A method as in claim 1, wherein the multithreaded processing of the layered code creates an electronic hardware database, wherein each layer of the layered code is processed to produce an element of the hardware database.

13. A method as in claim 1, wherein the multithreaded processing of the layered code can create an electronic hardware database and a combination of elements from the electronic hardware database in the form of an electronic circuit.

14. A method as in claim 1, wherein each layer starts and ends with a symbol including, respectively, a start token and an end token.

15. A method as in claim 1, wherein the multithreaded processing of code includes program generation, compilation and linking.

16. A multithreaded layered-code processor, comprising:
means for traversing through the layered code to discover each layer of the layered code;
means for determining whether to spawn a thread to process the discovered layer;
means for spawning the child thread, if it is determined to spawn the thread, for processing the discovered layer;
means for acquiring a lock, before spawning a child thread when a parent thread encounters a start token of a nested layer of the layered code, to exclude other threads from accessing the child thread;
means for releasing the lock;
means for proceeding with execution of the thread concurrently with other threads; and
wherein the child thread cannot inherit definitions from the parent thread.

17. A processor as in claim 16, wherein the multithreaded processing of code includes program generation, compilation and linking.

18. A computer readable medium embodying computer program code configured to cause a computer system to perform steps for multithreaded processing of layered code, comprising:
traversing through the layered code to discover each layer of the layered code;
determining whether to spawn a thread to process the discovered layer, and, if it is determined to spawn the thread:
acquiring a lock, before spawning a child thread when a parent thread encounters a start token of a nested layer of the layered code, to exclude other threads from accessing the child thread;
spawning the child thread to process the discovered layer;
release the lock;
proceeding with execution of the child thread concurrently with other threads; and
wherein the child thread cannot inherit definitions from the parent thread.

19. A computer readable medium as in claim 18 embodying further computer program code configured to cause the computer to perform further steps, comprising:
releasing the lock once the child thread is either spawned or aborted.

20. A computer-readable medium as in claim 18, wherein the multithreaded processing of code includes program generation, compilation and linking.

21. A multithreaded layered-code processor, comprising:
a multiprocessor environment for concurrent execution of multiple threads, and
a memory including a code processor, the code processor including:
means for traversing through the layered code to discover each layer of the layered code;
means for determining whether to spawn a thread to process the discovered layer;
means for spawning the child thread, if it is determined to spawn the thread, for processing the discovered layer;
means for acquiring a lock, before spawning a child thread when a parent thread encounters a start token of a nested layer of the layered code, to exclude other threads from accessing the child thread;
means for releasing the lock;
means for proceeding with execution of the thread concurrently with other threads; and
wherein the child thread cannot inherit definitions from the parent thread.

22. A system as in claim 21, wherein the code processor includes a compiler.

23. A system as in claim 21, wherein the memory includes a global memory that is used as a shared resource in the multiprocessor environment.

24. A system as in claim 21, wherein the system is a network of computers.

25. A system as in claim 21, wherein the multiprocessor environment is a tightly-coupled multiprocessor system.

26. A system as in claim 21, wherein the multiprocessor environment is a loosely-coupled multiprocessor system functioning as a distributed system.

27. A system as in claim 21 further including an operation system capable of multiprogramming and timesharing for coordinating the multithreaded layered-code processing in the multiprocessor environment.

28. A system as in claim 21, wherein the multithreaded processing of code includes program generation, compilation and linking.

\* \* \* \* \*